United States Patent
Heier

(10) Patent No.: US 6,929,060 B2
(45) Date of Patent: Aug. 16, 2005

(54) HEAT EXCHANGER, AND METHOD OF MAKING A HEAT EXCHANGER

(75) Inventor: Jürgen Heier, Duisburg (DE)

(73) Assignee: GEA Luftkühler GmbH, Bochum (DE)

( * ) Notice: Subject to any disclaimer, the term of this patent is extended or adjusted under 35 U.S.C. 154(b) by 0 days.

(21) Appl. No.: 10/717,200

(22) Filed: Nov. 18, 2003

(65) Prior Publication Data

US 2005/0051314 A1 Mar. 10, 2005

(30) Foreign Application Priority Data

Nov. 22, 2002 (DE) .......................................... 102 54 797

(51) Int. Cl.[7] ................................................. F28F 9/04
(52) U.S. Cl. ..................................... 165/173; 165/175
(58) Field of Search ................................. 165/173, 172, 165/175, 79; 29/890.052, 890.03; 411/82, 82.1

(56) References Cited

U.S. PATENT DOCUMENTS

| | | | | |
|---|---|---|---|---|
| 1,347,219 A | * | 7/1920 | Gibson ........................ 165/149 |
| 2,839,276 A | * | 6/1958 | Rossi ........................... 165/81 |
| 3,489,209 A | * | 1/1970 | Johnson ....................... 165/172 |
| 3,739,840 A | * | 6/1973 | Jones .......................... 165/175 |
| 4,967,836 A | * | 11/1990 | Nakamura ................... 165/173 |
| 4,993,900 A | * | 2/1991 | Hugel et al. ................ 411/82.1 |
| 5,865,244 A | * | 2/1999 | Moser ......................... 165/173 |
| 6,026,804 A | * | 2/2000 | Schardt et al. .............. 165/173 |
| 6,050,331 A | * | 4/2000 | Breault et al. .............. 165/171 |
| 6,295,980 B1 | * | 10/2001 | Lopez et al. ................ 165/173 |
| 2004/0064946 A1 | * | 4/2004 | Smith et al. ........... 29/890.043 |

FOREIGN PATENT DOCUMENTS

DE  27 49 205  *  5/1979

* cited by examiner

Primary Examiner—Teresa J. Walberg
(74) Attorney, Agent, or Firm—Henry M. Feiereisen

(57) ABSTRACT

A heat exchanger includes a tube bottom made of pressure-resistant and temperature-resistant plastic, and a plurality of tubes which are disposed in side-by-side relationship in the tube bottom and form at least indirectly part of a distribution and/or collecting chamber. The tubes have tube ends which are each provided with a circumferential securing member to inhibit extraction of the tubes from the tube bottom when the tube ends are firmly secured in the tube bottom through a casting process or injection process.

10 Claims, 3 Drawing Sheets

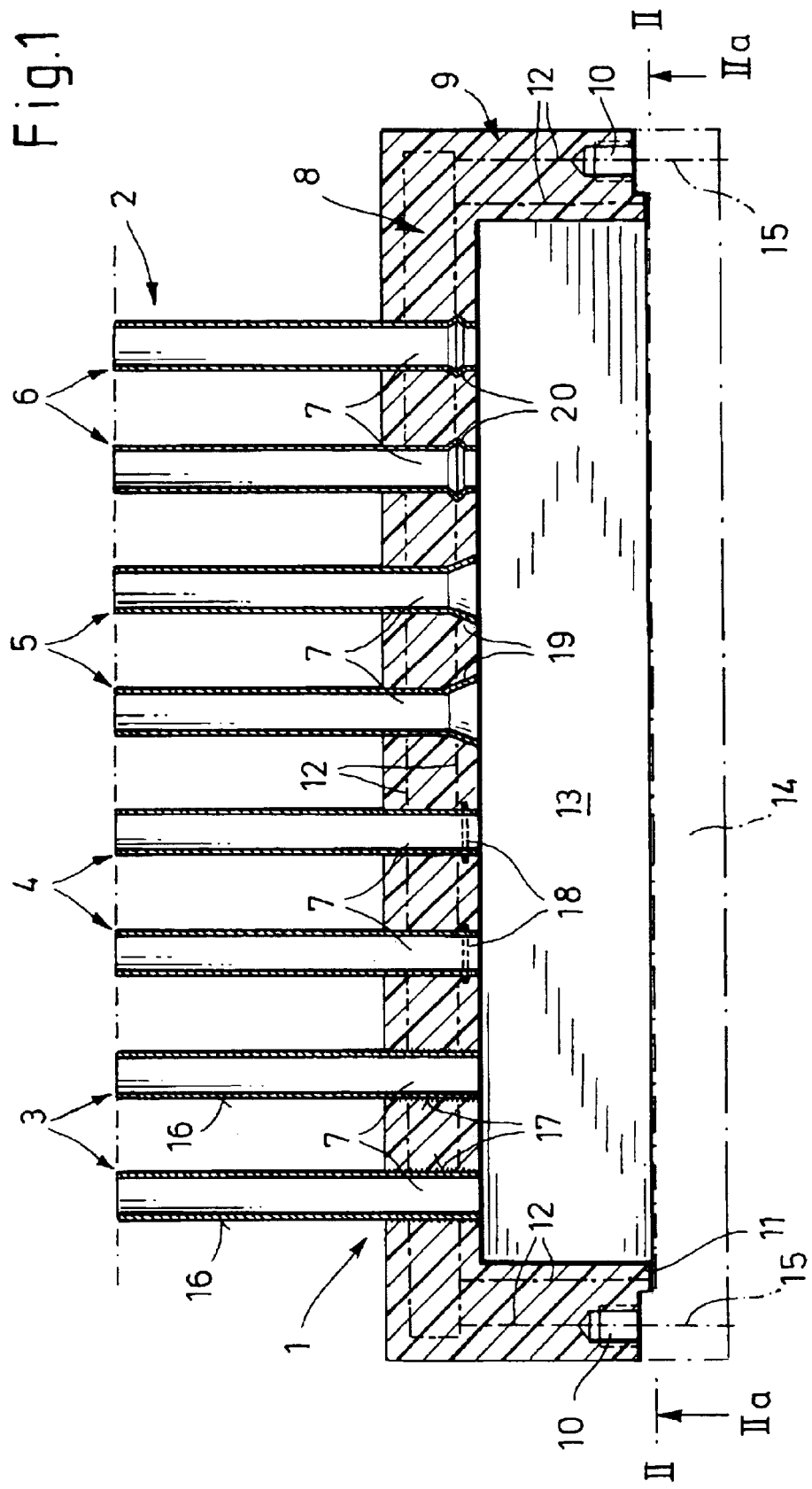

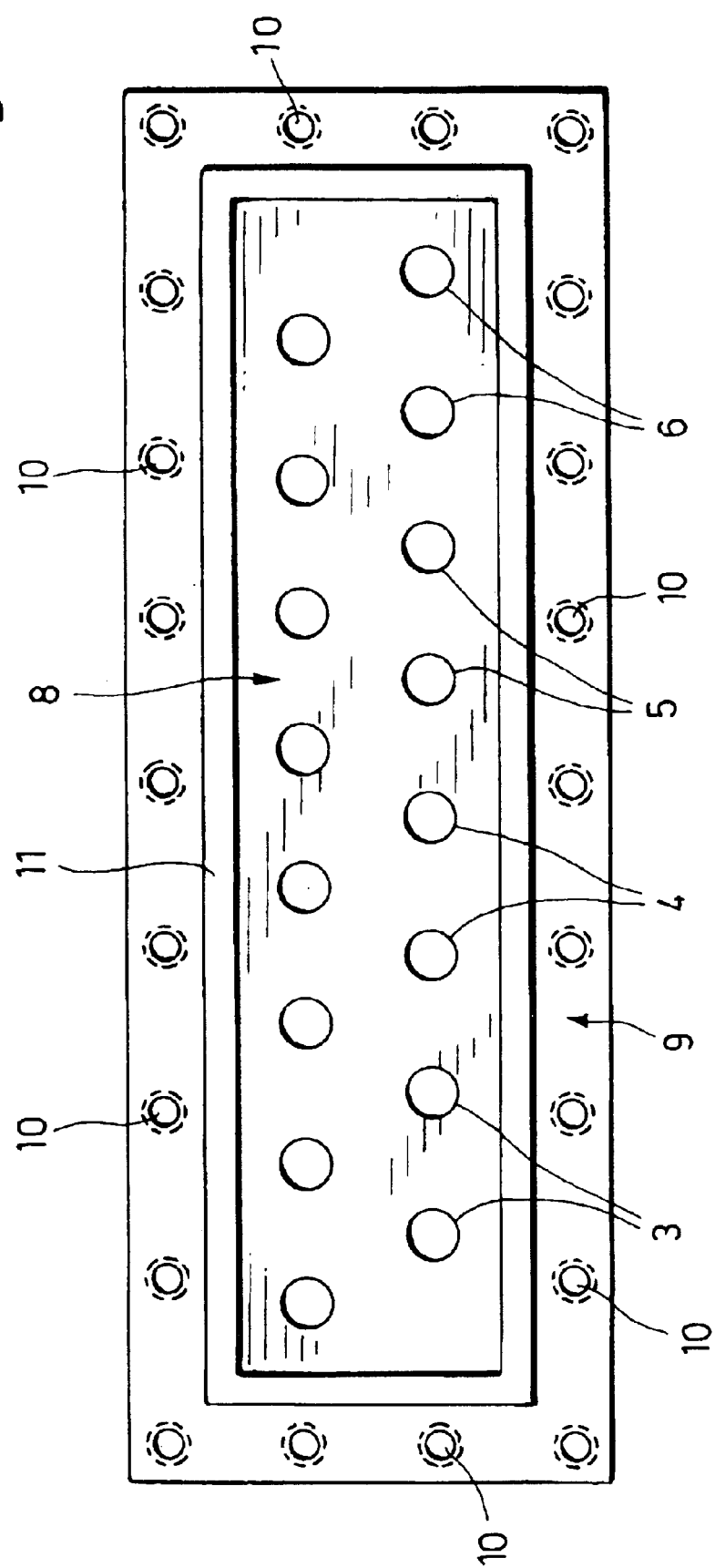

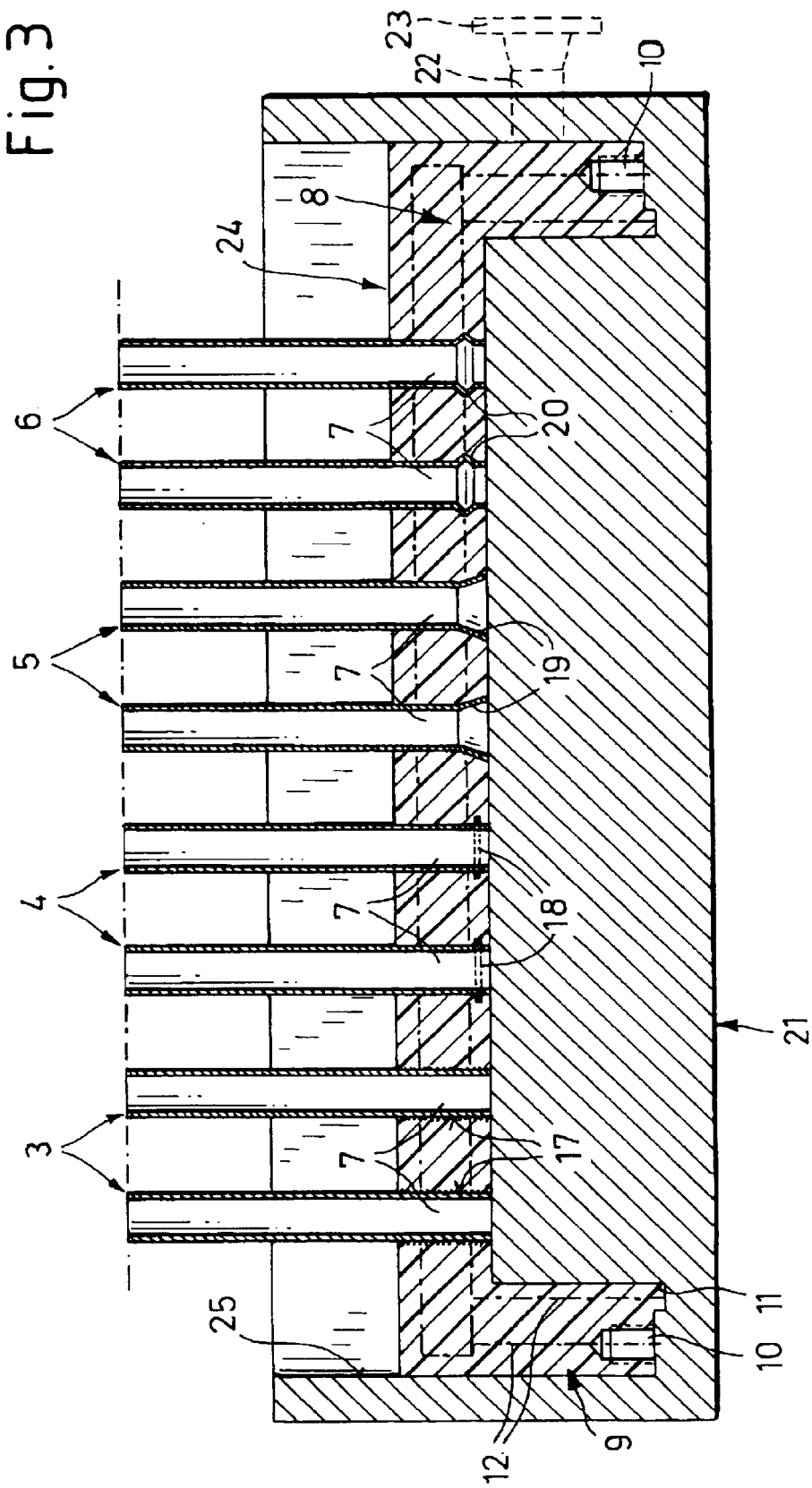

HEAT EXCHANGER, AND METHOD OF MAKING A HEAT EXCHANGER

CROSS-REFERENCES TO RELATED APPLICATIONS

This application claims the priority of German Patent Application, Serial No. 102 54 797.1, filed Nov. 22, 2002, pursuant to 35 U.S.C. 119(a)–(d), the disclosure of which is incorporated herein by reference.

BACKGROUND OF THE INVENTION

The present invention relates to a heat exchanger, and to a method of making a heat exchanger. More specifically, the present invention relates to a connection between tubes and tube bottom of a heat exchanger.

In general, heat exchangers of the type involved here include a tube block for circulation of a medium. The tube block is formed by a plurality of tubes which may be made of metal or plastic and are placed in side-by-side relationship, with their ends being held in the tube bottom. At least part of the tubes is formed with ribs. In order to hold the tube ends of the tubes in the tube bottoms as at least indirect components of distributor and/or collecting chambers, the tube bottom is formed with holes in which the tubes are inserted and welded or rolled-in. The connection of the tubes in the tube bottoms is complicated and time-consuming because a tube bottom has first to be cut to shape, and then has to be finished and formed with the necessary number of holes. Subsequently, the heat-exchanger tubes must be inserted with their tube ends into the holes. Not only is the manufacture complicated but corrosion may be encountered in the gap between a hole and the tube end of a tube.

In order to ensure clarity, it will be understood that the term "side-by-side" disposition of the tubes relates to a parallel relationship of the tubes as well a to a configuration in which the tubes are placed next to one another at a slight angle. In addition, it will be appreciated by persons skilled in the art that the tubes may, of course, exhibit a helical configuration, at least along predetermined sections thereof.

It would be desirable and advantageous to provide an improved heat exchanger to obviate prior art shortcomings and to allow its manufacture in a simple and rapid manner.

SUMMARY OF THE INVENTION

According to one aspect of the present invention, a heat exchanger includes a tube bottom made of pressure-resistant and temperature-resistant plastic, and a plurality of tubes disposed in side-by-side relationship in the tube bottom and forming at least indirectly part of a distribution and/or collecting chamber, wherein the tubes have tube ends which are each provided with a circumferential securing member to inhibit extraction of the tubes from the tube bottom by anchoring the tube ends with the securing member in the tube bottom through a casting process or injection process.

The present invention resolves prior art shortcomings by making the tube bottom of pressure-resistant and temperature-resistant plastic material and forming the tube ends with a securing member that inhibits extraction of the tubes from the tube bottom, so that the tubes are firmly anchored in the tube bottom. Suitably, the plastic material for the tube bottom is selected to withstand temperatures of up to 100° C. during continuous operation and up to 220° C. over short periods. The exposure to pressure may rise up to about 100 bar. Examples of plastics include PU (polyurethane), PP (polypropylene), synthetic resin, epoxy resin or cross-linked PU.

According to another aspect of the present invention, a method of making a heat exchanger includes the steps of providing each tube end of a plurality of tubes with a securing member to inhibit extraction of the tubes from a tube bottom, positioning the tubes in a vertical side-by-side relationship in a casting or injection mold, and firmly anchoring the tube ends in the tube bottom through casting or injection molding with a pressure-resistant and temperature-resistant plastic.

Compared to prior art methods, the present invention requires only a single work step to firmly hold the tube ends of the tubes in the tube bottom. In addition, the formation of corrosion in the tube bottom is eliminated, and it is also possible to provide a corrosion protection of the tubes between the terminal tube bottoms e.g. in the form of a zinc coat or a bimetallic tube.

Tubes involved here may be smooth or ribbed metallic tubes of steel, vanadium, copper or brass. Of course the tubes may also be made of plastic such as polypropylene, polyurethane or PEX (cross-linked polyethylene).

The tube bottoms may be made of any suitable configuration, depending on the type of heat exchanger being used. In other words, the tube bottoms may be round or rectangular.

A heat exchanger according to the invention is thus conducive for realizing slight weights of the tube block so that costs for the support frames can be lowered as well. In addition, replacement parts can be easily and quickly made available. A particular advantageous use of a heat exchanger according to the present invention is the application in air/liquid heat exchangers with tubes through which a liquid medium flows while cooling air sweeps around the outside of the tubes.

According to another feature of the present invention, the tube bottom may have a trough-shaped configuration and may be provided with a circumferential flange into which metallic threaded sleeves are cast or injection-molded. In this way, except for the lid, also the distributor and/or collecting chambers in single-part or multi-part configuration may be made in one piece, optionally with partition walls, with the tube bottoms. The lids can be firmly connected to the circumferential flanges via the threaded sleeves and screw bolts.

According to another feature of the present invention, the tube bottom may be provided with plural pipes, each of which having a flange. In this way, the feed and drain devices for the various media may also be tightly connected directly or indirectly with the tube bottoms without corrosion in the gaps. Suitably, the tube bottoms and, optionally the flanges, may be provided with reinforcements to enable the tube bottoms or also the distribution and/or collecting chambers to withstand higher pressures. The reinforcements may be made of fiber glass, metallic wires or carbon fibers.

According to another feature of the present invention, the securing member may be implemented by embossments formed on the tube ends. As an alternative, the securing member may be implemented by funnel-shaped flared portions of the tube ends, or by rings attached circumferentially to the tube ends, or by surface roughening of the tube ends about their circumference.

BRIEF DESCRIPTION OF THE DRAWING

Other features and advantages of the present invention will be more readily apparent upon reading the following description of currently preferred exemplified embodiments of the invention with reference to the accompanying drawing, in which:

FIG. 1 is a vertical longitudinal section of an end region of a heat exchanger according to the present invention, illustrating four different variations of connecting tube ends to a tube bottom;

FIG. 2 is a representation of the heat exchanger taken along the line II—II in FIG. 1 and viewed in the direction of arrow IIa; and FIG. 3 is a vertical cross section of an apparatus for making a tube bottom to anchor the tubes of a heat exchanger according to the present invention.

DETAILED DESCRIPTION OF PREFERRED EMBODIMENTS

Throughout all the Figures, same or corresponding elements are generally indicated by same reference numerals. These depicted embodiments are to be understood as illustrative of the invention and not as limiting in any way. It should also be understood that the drawings are not necessarily to scale and that the embodiments are sometimes illustrated by graphic symbols, phantom lines, diagrammatic representations and fragmentary views. In certain instances, details which are not necessary for an understanding of the present invention or which render other details difficult to perceive may have been omitted.

Turning now to the drawing, and in particular to FIG. 1, there is shown a vertical longitudinal section of an end region of a heat exchanger according to the present invention, generally designated by reference numeral 2. For convenience and sake of simplicity, the heat exchanger 2 will be described hereinafter only in connection with those parts that are necessary for the understanding of the present invention. The heat exchanger 2 includes a plurality of tubes 3, 4, 5, 6 disposed in side-by-side relationship and having tube ends 7 for connection to a tube bottom 8. For convenience and sake of simplicity, the tubes 3, 4, 5, 6 are shown in FIG. 1 in pairs as representatives of four different variations by which the tube ends 7 can be configured in accordance with the present invention. Thus, FIG. 1 shows, in fact, four embodiments of a heat exchanger according to the present invention.

The tube bottom 8 is made of plastic which is able to withstand a temperature of up to 100° C. during continuous operation and up to 220° C. over short periods. The exposure to pressure may rise up to about 100 bar. Examples of suitable plastic material include PU (polyurethane), PP (polypropylene), synthetic resin, epoxy resin or cross-linked PU. The tube bottom 8 has a trough-shaped configuration with a circumferential flange 9 into which metallic threaded sleeves 10 are cast, as also shown in FIG. 2. The flange 9 is formed on the end surface distal to the tubes 3, 4, 5, 6 with a circumferential centering collar 11. The tube bottom 8 and the flange 9 may include reinforcements 12 of fiber glass, metallic wires or carbon fibers to provide a stabilizing effect.

The tube bottom 8 and the flange 9 form a distribution or collecting chamber 13 which can be tightly closed by a lid 14, shown only by way of a dashdot line. Screw bolts 15 can be rotated into the threaded sleeves 10 to attach the lid 14 to the tube bottom 8 and are also shown only by way of dashdot lines.

The following description relates to the various options of connection of the tubes 3, 4, 5, 6 to the tube bottom 8. Hereby, the tubes 3, 4, 5, 6 are provided with a securing member which inhibits an extraction of the tubes from the tube bottom 8. With reference to the tubes 3, it can be seen that the securing member is implemented by roughening an outer surface 16 of the tubes 3 in the area of the tube ends 7, as indicated by reference numeral 17. The embodiment of the tubes 4 involves tubes which are provided with circumferential rings 18 to provide the securing member. The tubes 5 are provided with a securing member in the form of funnel-shaped flared portions 19, while the tubes 6 have a securing member in the form of circumferential embossments 20.

In order to make the tube bottom 8 with the flange 9, as shown in FIGS. 1 and 2, and to realize the firm connection of the tubes 3, 4, 5, 6 in the tube bottom 8, a casting mold 21 is used as shown in FIG. 3. The casting mold 21 has an inside contour 25 which matches the configuration of the tube bottom 8 with flange 9 to be made. The production of the heat exchanger 2 is as follows: In a first step, the tube ends 7 of the tubes are formed with the desired one of the securing members 17, 18, 19, 20. The thus made tubes are then placed in vertical side-by-side relationship in the casting mold 21, and the threaded sleeves 10 as well as the reinforcements 21 are attached and incorporated, respectively. Optionally, at least one pipe 22 with flange 23 may additionally be attached. Subsequently, a pressure-resistant and/or temperature-resistant plastic material 24, such as PU (polyurethane), PP (polypropylene), synthetic resin, epoxy resin, or cross-linked PU, is poured into the mold 21 to form the tube bottom 8 with embedded tube ends 7 including the securing member. After curing of the plastic material and elapse of a sufficient cool-down period, the molded article, i.e. tube bottom 8 with the tubes, can be removed from the mold 21, whereby the tube ends 7 of the tubes are firmly anchored in the tube bottom 8 and the reinforcements are firmly embedded in the tube bottom 8 and the flange 9. In addition, the threaded sleeves 10 as well as the pipes 22 are firmly placed in the flange 9.

While the manufacturing process is described with reference to a casting mold 21, it is, of course, also possible to use an injection mold in order to make the tube bottom 8 with firmly anchored tube ends 7 of the tubes, 3, 4, 5, 6 in accordance with the present invention. In addition, the incorporation of the reinforcements 12 may be carried out before or during casting or injection molding process. Also the attachment of the pipes 22 with flanges 23 as well as the threaded sleeves 10 may be carried out before or during casting or injection molding process.

While the invention has been illustrated and described in connection with currently preferred embodiments shown and described in detail, it is not intended to be limited to the details shown since various modifications and structural changes may be made without departing in any way from the spirit of the present invention. The embodiments were chosen and described in order to best explain the principles of the invention and practical application to thereby enable a person skilled in the art to best utilize the invention and various embodiments with various modifications as are suited to the particular use contemplated.

What is claimed as new and desired to be protected by Letters Patent is set forth in the appended claims and includes equivalents of the elements recited therein:

1. A heat exchanger, comprising:
    a tube bottom made of pressure-resistant and temperature-resistant plastic selected from the group consisting of PU (polyurethane), synthetic resin, epoxy resin, and cross-linked PU, said tube bottom having a trough-shaped configuration and provided with a circumferential flange;

a plurality of tubes disposed in side-by-side relationship in the tube bottom and forming at least indirectly part of a distribution and/or collecting chamber, said tubes being made of metal selected from the group consisting of steel, vanadium, copper, and brass, wherein the tubes have tube ends which are each provided with a circumferential securing member to inhibit extraction of the tubes from the tube bottom by anchoring the tube ends with the securing member in the tube bottom through a casting process or injection process; and a plurality of metallic threaded sleeves formed in the flange of the tube bottom through a casting process or injection process.

2. The heat exchanger of claim 1, wherein the tube bottom is provided with plural pipes, each of which having a flange.

3. The heat exchanger of claim 1, wherein the tube bottom is provided with reinforcements.

4. The heat exchanger of claim 3, wherein the reinforcements are made of a material selected from the group consisting of fiber glass, metallic wire, and carbon fiber.

5. The heat exchanger of claim 1, wherein the flange is provided with reinforcements.

6. The heat exchanger of claim 5, wherein the reinforcements are made of a material selected from the group consisting of fiber glass, metallic wire, and carbon fiber.

7. The heat exchanger of claim 1, wherein the securing member is implemented by embossments formed on the tube ends.

8. The heat exchanger of claim 1, wherein the securing member is implemented by funnel-shaped flared portions of the tube ends.

9. The heat exchanger of claim 1, wherein the securing member is implemented by rings attached circumferentially to the tube ends.

10. The heat exchanger of claim 1, wherein the securing member is implemented by surface roughening of the tube ends about their circumference.

* * * * *